United States Patent [19]

Lathrop et al.

[11] Patent Number: 5,465,364
[45] Date of Patent: Nov. 7, 1995

[54] METHOD AND SYSTEM FOR PROVIDING DEVICE DRIVER SUPPORT WHICH IS INDEPENDENT OF CHANGEABLE CHARACTERISTICS OF DEVICES AND OPERATING SYSTEMS

[75] Inventors: Frederick L. Lathrop, Delray Beach; Kenneth A. Rowland, Boynton Beach, both of Fla.

[73] Assignee: International Business Machines, Inc., Armonk, N.Y.

[21] Appl. No.: 210,530

[22] Filed: Mar. 18, 1994

Related U.S. Application Data

[63] Continuation of Ser. No. 970,434, Nov. 2, 1992, abandoned, which is a continuation of Ser. No. 411,074, Sep. 22, 1989, abandoned.

[51] Int. Cl.[6] .......................... G06F 13/12; G06F 13/10; G06F 3/00
[52] U.S. Cl. .................... 395/700; 395/500; 364/236.8; 364/238.3; 364/239.9; 364/280; 364/DIG. 1
[58] Field of Search .................................. 395/275, 500, 395/700

[56] References Cited

U.S. PATENT DOCUMENTS

| | | | |
|---|---|---|---|
| 4,555,775 | 11/1985 | Pike | 395/158 |
| 4,587,630 | 5/1986 | Straton et al. | 345/146 |
| 4,649,479 | 3/1987 | Advani et al. | 395/700 |
| 4,692,858 | 9/1987 | Redford et al. | 395/157 |
| 4,701,848 | 10/1987 | Clyde | 395/325 |
| 4,727,512 | 2/1988 | Birkner et al. | 395/500 |
| 4,773,005 | 9/1988 | Sullivan | 395/275 |
| 4,775,931 | 10/1988 | Dickie et al. | 395/275 |
| 4,797,854 | 1/1989 | Nakazaki et al. | 295/155 |
| 4,813,013 | 3/1989 | Dunn | 395/159 |
| 4,855,905 | 8/1989 | Estrada et al. | 395/500 |
| 4,859,995 | 8/1989 | Hansen et al. | 345/163 |
| 4,870,561 | 9/1989 | Love et al. | 364/192 |
| 4,896,290 | 1/1990 | Rhodes et al. | 395/650 |
| 4,896,291 | 1/1990 | Gest et al. | 395/156 |
| 4,905,185 | 2/1990 | Sakai | 395/146 |
| 4,914,624 | 4/1990 | Dunthorn | 395/275 |
| 4,924,378 | 5/1990 | Hershey et al. | 395/200 |
| 4,931,935 | 6/1990 | Ohira et al. | 364/419.08 |
| 4,937,036 | 6/1990 | Beard et al. | 345/156 |
| 4,951,245 | 8/1990 | Bailey et al. | 395/275 |
| 4,972,368 | 11/1990 | O'Brien et al. | 395/275 |
| 4,975,829 | 12/1990 | Clarey et al. | 395/275 |
| 5,097,533 | 3/1992 | Burger et al. | 395/500 |
| 5,109,510 | 4/1992 | Baker et al. | 395/650 |
| 5,136,709 | 8/1992 | Shirakabe et al. | 395/700 |
| 5,191,655 | 3/1993 | Sarkissian | 395/275 |

OTHER PUBLICATIONS

Sagan; "Application Input Drivers"; Inside The IBM PCS; Byte 1987 Extra edition; pp. 143–144, 146, 148–150, 152, 154.

Meritt; "Software Communication of Device Command attributes"; IBM Tech. Disclosure Bulletin; vol. 23, No. 6. Nov. 1980; pp. 2415–2416.

Primary Examiner—Krisna Lim
Attorney, Agent, or Firm—Winfield J. Brown, Jr.; Michael J. Buchenhorner; Robert Leiber

[57] ABSTRACT

A program arrangement presently disclosed provides support within an operating system for a commonly used class of peripheral devices (e.g. mouse devices or, more generally, pointing devices). This arrangement effectively eliminates dependencies between device driver software associated with the supported device(s) and system (and/or application) software; so that device driver software can be created without extensive knowledge of the operating system and system software can be modified cost effectively without affecting the usefulness of existing device drivers. In this arrangement, device driving functions are assigned to two discretely separate program modules having a standardized interface. One module, included in the operating system, provides a device-independent base for coordinating device and system interaction. The other module is associated specifically and directly with supported devices, and can be created by programmers having little knowledge of the internal structure of the system software.

8 Claims, 4 Drawing Sheets

METHOD AND SYSTEM FOR PROVIDING DEVICE DRIVER SUPPORT WHICH IS INDEPENDENT OF CHANGEABLE CHARACTERISTICS OF DEVICES AND OPERATING SYSTEMS

This is a continuation of application Ser. No. 07/970,434, filed on Nov. 2, 1992, now abandoned, which is a continuation of original application Ser. No. 07/411,074, filed on Sep. 22, 1989, now abandoned

BACKGROUND OF THE INVENTION

This invention relates to a system and method of providing software support within an operating environment for connectable peripherals which are connectable to a computer system. More specifically, the invention relates to providing such support for peripheral devices such as pointing devices, typically a mouse.

In the past, in order to connect peripheral devices, such as pointing devices or a mouse, to a computer running an operating system, for example, such as PC DOS or IBM OS/2® which are well known. operating systems which are commercially available from IBM Corporation, each independent device had to have a device driver program module which was loaded into the computer enabling the device to work within the operating system. Typically, in order to prepare such modules the interfaces and other internal aspects of the operating system are needed to be documented and made known to the manufacturers of those devices to permit them to prepare the complicated device driver modules.

In the case of OS/2, for example, for each release specific mouse support interfaces have been defined and incorporated into the operating system. A problem with this is that the interfaces change from release to release, and therefore, original equipment manufacturers are faced with the task of having to provide completely new device drivers for their devices in order to permit them to operate with the newly released version of the operating system.

This problem is further complicated because in more recent developments, especially with operating systems such as OS/2, there are internal device interfaces which are undocumented, making it impossible for a peripheral device manufacturer to prepare a peripheral device support program module, i.e., driver or device driver.

In accordance with the invention, there is provided a solution to this problem by a specific modification of the operating system.

SUMMARY OF THE INVENTION

The invention as described herein is directed to an improvement in an operating system of the type employed in a computer system to permit the execution of application programs and operation of the system in combination with connected peripherals. When referring to computer systems, preferably the invention is intended to be directed to personal computers, i.e., stand-alone microprocessor based systems such as the IBM PC, PC XT, PC AT and the IBM PS/2 family of computers. Predetermined device drivers are required to support the operation of the connected peripherals and the improvement resides in that the operating system further comprises means for supporting operation of connectable peripheral devices in conjunction with the operating system. The means for support is logically independent of the type of peripheral device connected such that the peripheral device manufacturer now needs to merely provide a relatively small, as compared to said means for support, peripheral specific program module, i.e., device driver, which interacts with said means for support of the operating system. By logically independent is meant that the supporting means provided by the operating system operates and interacts in the same manner with that system and a class of device drivers (e.g. drivers for pointing devices), regardless of changes made to either the system or specific drivers in the class.

In a more specific aspect, the means for support comprises means for supporting an operating system's application programming interface, means for data formatting, means for inter-device communications (IDC), i.e., an IUC, and means for maintaining data areas. In its preferred aspect, the connectable peripheral devices are pointing devices, more specifically, a mouse.

In accordance with the invention, the traditional prior art mouse or peripheral device program module is split into two separate modules. The first module is a device dependent program module which contains all code to support the specific hardware requirements of the attached mouse device. This module now becomes replaceable because it contains solely system interface code and an original equipment manufacturer (OEM) could thus replace the module with its own and have the device supported by the operating system. More specifically, the module now includes a single system interface and the device specific support code.

The second module, which is incorporated into the operating system as part of the operating system, is a device independent program module. It contains the remainder of what in the prior art is the original program module, extensive modifications having been made to make it independent of the type of pointing device, i.e., mouse device, supported by the device dependent program module. The device independent module maintains support for the programming interface to the rest of the operating system and supports the undocumented internal interfaces to other system modules.

In implementing the invention, an interface is defined between the new program module in the operating system and the independent module so that the new interface is used by both the device dependent module and the independent module to communicate with each other. This is done using the IDC mechanism which was previously discussed. The IDC mechanism is a defined method that allows two device driver program modules to communicate directly. This IDC interface is used by both modules to carry out normal operations of the mouse device and is defined in the IBM OS/2 operating system documentation. Implementation of this mechanism is known, conventional and easily implemented, based on this description, by those of ordinary skill in this art.

Under the present invention, two unexpected advantages result. The first advantage is that the peripheral device manufacturer need only write the device dependent software module once. The device will then be supported under all future releases of the operating system which support the current documented device driver architecture. This is true because the device dependent program module does not have any interfaces to the operating system that are required for the normal operation of the connected mouse device. The only interfaces defined are those that are required for any replaceable device driver program module. As an example, if the user installed a new release, there are no required device dependent driver modules to be provided by the peripheral device manufacturer to support the peripheral device operation with the new release of the operating system other than that which was previously provided. The second advantage is extendibility. More specifically, by extendable is meant that the invention was designed to handle mouse devices in its preferred embodiment, but can be used to handle any type of pointing device.

By pointing device is meant a visual interface device which allows a user to point to or select objects or predetermined selected areas of a computer screen. The device independent module which is provided by the operating system does not "care" what type of device is attached. As a result a peripheral device manufacturer can write a device dependent module to support any type of pointing device desired. Examples of other types of pointing devices include, but are not limited to, light pens, touch pads, touch screens, roller balls, joy sticks and the like.

BRIEF DESCRIPTION OF THE DRAWINGS

Having briefly described the invention, the same will become better understood from the following detailed discussion taken in conjunction with the attached drawings wherein.

DETAILED DISCUSSION OF THE INVENTION

Although this invention could be implemented on any computer system that allows a pointing device to be attached and to operate loadable device drivers, the invention will be discussed with particular reference to IBM Corporation's OS/2 operating system operating, for example, on an IBM PS/2 personal computer with sufficient memory to permit operation of the operating system therewith.

Figure 1:
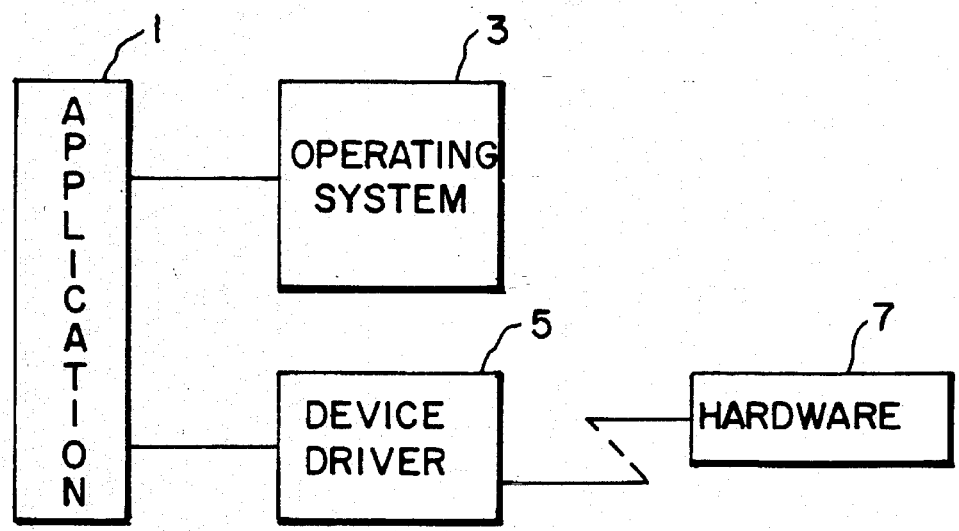
FIG. 1 represents a typical system supporting hardware that has no system level support included with the operating system.

As shown in FIG. 1, prior art systems do not include attachable device support as part of the operating system. In operation, an application 1 would then interface directly to the operating system 3 for system services and to the separate device driver 5 for device support services. Device support services can be referred to as an application programming interface, i.e., an API. The device driver 5 interfaces directly to the hardware 7. This type of system is used to support many different types of devices, including pointing devices. An example of such prior art support is PC DOS.

Figure 2:
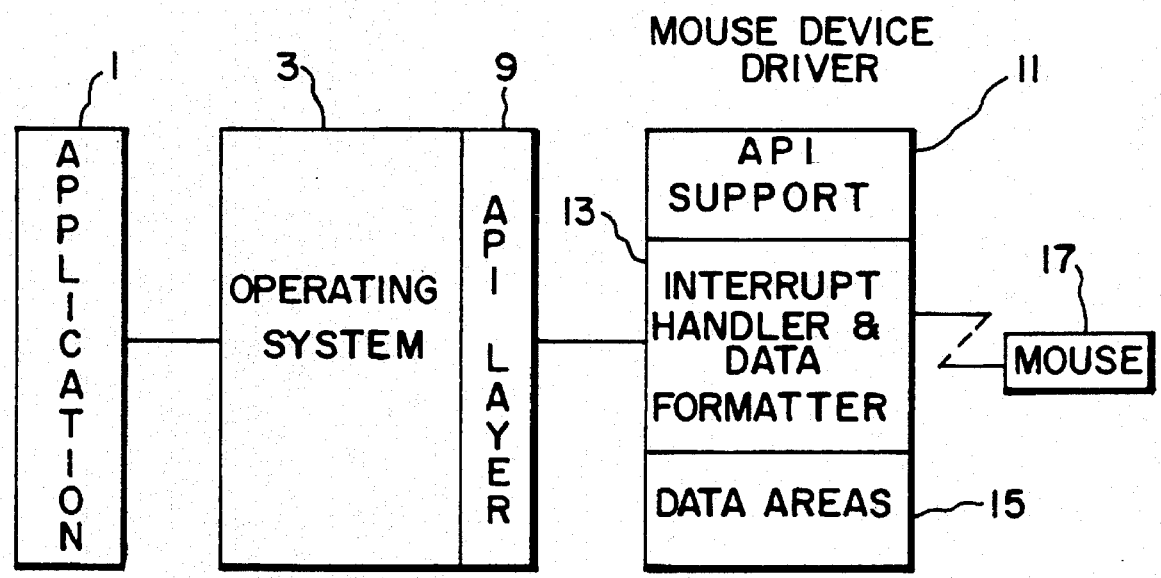
FIG. 2 shows a simplified system view, e.g., of the IBM OS/2 operating system, for mouse support in accordance with the prior art.

As the mouse became a widely accepted pointing device, operating systems began including mouse support as part of the system. FIG. 2 shows a typical operating, e.g., OS/2, system view of mouse support prior to this invention. An application 1 no longer interfaces directly to a device driver for the device API, instead it interfaces with the system 3 through an API layer 9. The API layer 9 then interfaces with the device driver (not numbered).

Also shown in FIG. 2 is the internals of the prior art mouse device driver (not numbered). By internals is meant the logical divisions in the modules providing the separate responsibilities for normal operation. Each internal area has a specific responsibility or function, and may include private or non-published interfaces to other component modules of the system. In discussing such a driver, for ease of understanding, the mouse device driver can be discussed as broken into three parts. First is the API support 11. This part is responsible for interfacing to the API layer 9 which is part of the system 3. The second part is the interrupt handler and data formatter 13. This part reads all interrupt data from the mouse device 17 then converts it into a generic mouse event. The event is then added to appropriate event queue. The last part is the data areas 15. The data areas 15 contain all movement control variables, the event queues, and other control variables. Device dependencies are built into the entire device driver module. Device dependencies include, but are not limited to: 1) data format and size; 2) mouse type, e.g., serial, bus, etc.; 3) interrupt rates; 4) machine base; 5) mouse driver, number of buttons; 6) movement resolution; and/or 7) method of disabling. Each part of the module is dependent on the type of mouse attached and its hardware operating specifics are implemented in a conventional manner as will be readily apparent to those of ordinary skill in this art.

Figure 3:
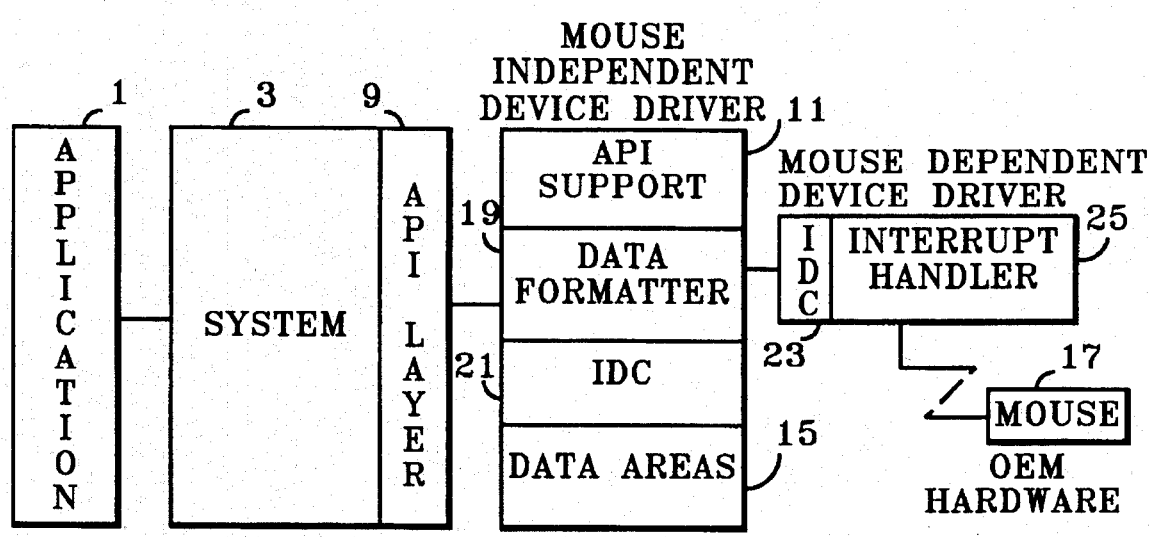
FIG. 3 shows a simplified system view, for example, of the IBM OS/2 operating system, providing mouse support in accordance with the invention.

In accordance with this invention the resulting system is shown in FIG. 3. The device driver module in FIG. 2 has been split into two parts. This was done by identifying all hardware dependencies throughout the device driver module and placing them in a separate device driver module. This resulted in two separate device driver modules. These are labeled mouse independent device driver 11, 19, 21, and 15, and mouse dependent device driver 23 and 25 in FIG. 3. The mouse dependent device driver 23 and 25 contains all the hardware dependent code from the previous mouse device driver. This part of the invention, as a result of the separation, requires an inter-device communication part (IDC) to each of the resulting device drivers. The IDC comprises parts 21 and 23 in FIG. 3 of the two device drivers. The IDC 21 and 23 is used for communication between the two device drivers. The mouse independent device driver uses the IDC 21 to control the state of the mouse hardware and to query its operating characteristics. The mouse dependent device driver uses the IDC 21 to report mouse event data in a common format, i.e., common event packet, to the mouse independent device driver. The mouse independent device driver then processes the common event packet. By putting all device operation dependencies in the device dependent device driver, the device independent device driver is independent of the type of hardware attached.

Figure 4A:
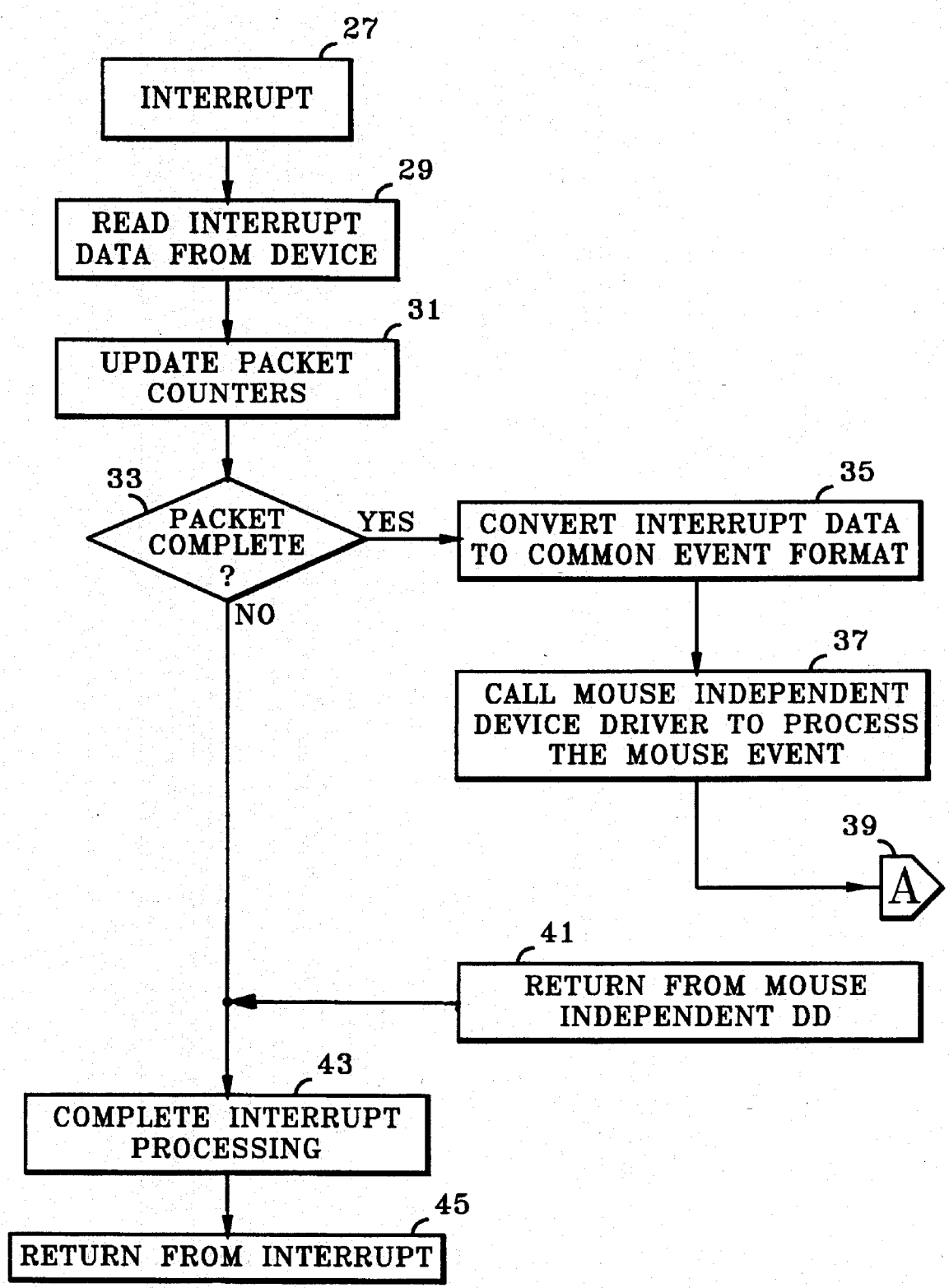
FIG. 4A shows the steps taken by a typical mouse, or any pointing device, dependent device driver when it receives an interrupt from the pointing device.

FIG. 4a is a general flow diagram of the control for the mouse dependent device driver when it receives an interrupt from the mouse hardware. An interrupt 27 is first generated. Thereafter, the interrupt data is read in step 29 from the device, i.e., the mouse hardware. This is a device dependent step and function, and differs for each mouse device and for each machine base the mouse device is supported on. In step 31 the interrupt data is accumulated. Most mouse devices generate several interrupts to report a complete hardware dependent mouse event. Thereafter, at step 33 it is determined if a complete hardware dependent mouse event has been accumulated. If so, then at step 35 the device dependent mouse event data is converted into a common mouse event packet. A call 37 is then made to the mouse independent device driver to process the common event packet. This call 37 is done using the IDC 21 interface which is part of the mouse independent device driver in a conventional manner. A return 39 is then processed from the mouse independent device driver to the mouse dependent device driver. At this time the common event packet has been processed. The mouse dependent device driver then completes the interrupt processing in step 43 and executes a return 45 from interrupt sequence. If a complete hardware dependent mouse event has not yet been received at step 33, then interrupt processing is completed at step 43 and the return 45 from the interrupt sequence is then executed. Whatever was interrupted then resumes.

Figure 4B:
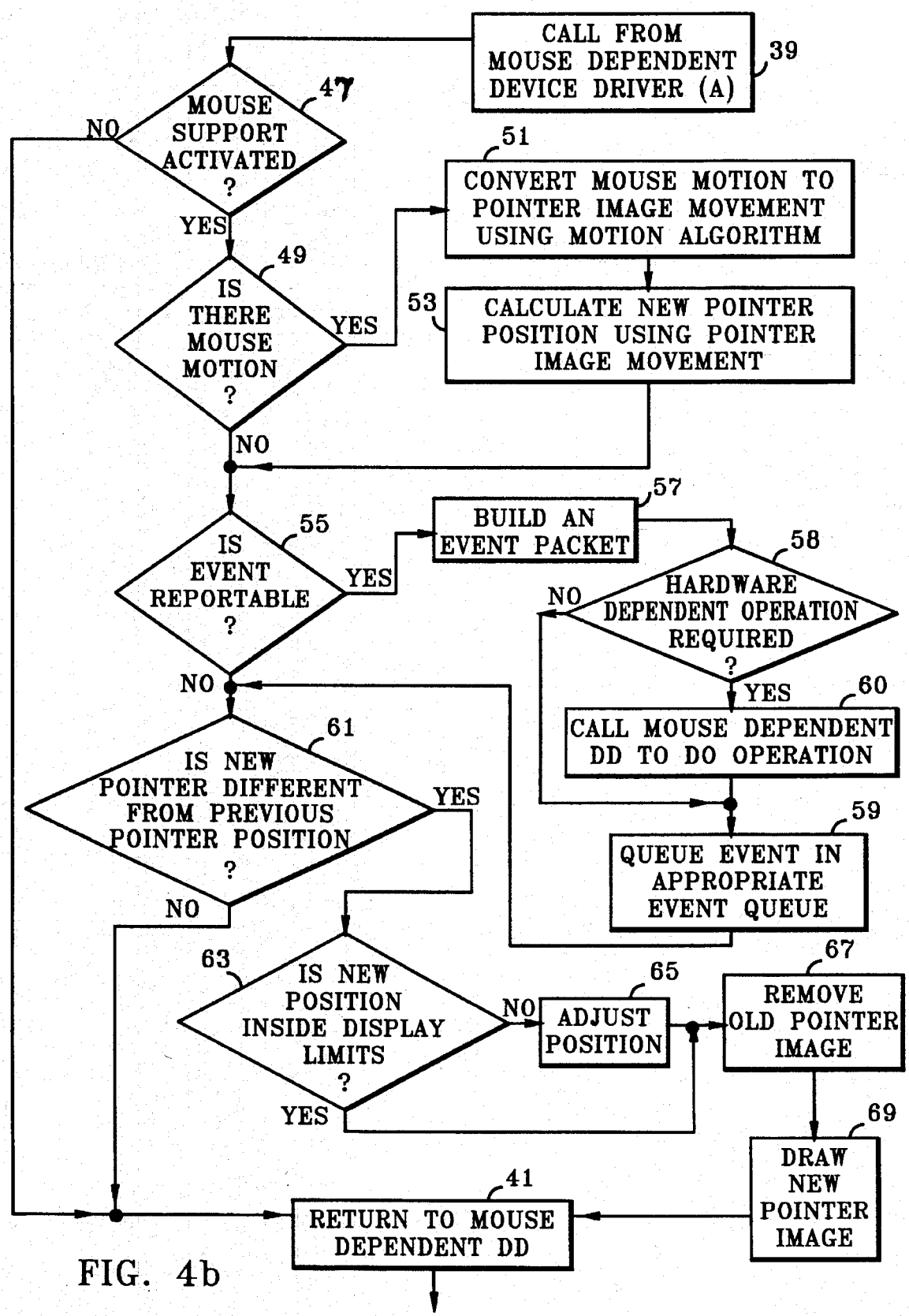
FIG. 4B represents the flow in the mouse independent device driver when it receives a call from the mouse dependent device driver to process a mouse event.

FIG. 4b is a general flow control diagram of the operation used by the mouse independent device driver to process a common event packet from the mouse dependent device driver 39. First a test is done in 47 to see if mouse support has been activated. Mouse support is considered activated if the following conditions are met: 1) an application, such as the IBM OS/2 Presentation Manager shell, has opened the mouse; and 2) the video display mode is supported so that the pointer image can be tracked correctly on the display. If so then the event is processed. If not then the event is ignored and control is passed back to the mouse dependent device driver. If support has been activated then it is determined at step 49 if the mouse moved. If so, then a conversion 51 is made of the mouse motion to pointer image movement on the screen and a calculation 53 is made to determine the new pointer position. This involves a conventional well-known and easily implemented algorithm using mouse motion parameters for converting physical mouse motion to display mode dependent motion. Otherwise the new pointer image position is the same as the old pointer image position. At step 55 it is determined if the mouse event should be reported to the application(s) using the mouse. If so, then step 57 builds a generic mouse event from the common event packet and the newly calculated pointer position. Step 58 determines if a hardware dependent operation is required. If so, then step 60 will call the mouse dependent device driver to perform the operation. Step 59 then places the mouse event in the appropriate mouse event queue, e.g., as a First-In-First-Out (FIFO) queue. In step 61 the previous pointer image position is compared to the new pointer image position. If the positions are different, then at step 63 a check of the new position is made to determine if it is inside the current display mode limits. If not, then at step 65 an adjustment of the pointer image position is made so that it is inside the display mode limits. At step 67 the previous pointer image is removed from the previous pointer position. The pointer image is then drawn at step 69 at the new pointer image position. Control is then given back to the mouse dependent device driver 41. Steps 67 and 69 in the IBM OS/2 operating system are performed through a pointer inter-device communication, i.e., IDC (not shown) interface which is documented in the IBM Technical References for OS/2 operating system, and well known to those of ordinary skill in the art.

Step 59, where the mouse event is queued, involves a check to see what queueing method is active for the session. There are two queueing modes that can be active. The first is normal queuing mode. In this mode the event is sent to the event queues that the mouse independent device driver maintains in its own data areas. The second queueing mode is single queue mode. In single queue mode the mouse event is sent to a separate OS/2 component for queueing. Single queue mode and all related operations for supporting single queue mode are undocumented in the OS/2 related publications. In accordance with the invention, these interfaces remain undocumented.

For completeness in disclosing the invention in its preferred embodiment a technical discussion of these interfaces now follows. This information in conjunction with information found in the IBM OS/2 technical reference publications, which are incorporated specifically by reference herein, complete the information needed for one of ordinary skill in the art to implement this invention under the IBM OS/2 operating system.

In order to activate single queue mode, a MouSetDevStatus call with bit 2 in the high byte of the new device status word must be set. The following interface described, other than for the documentation provided herein, is not currently documented with IBM OS/2 publications or technical references. When the mouse independent device driver detects that single queue mode is being activated it will perform the following steps:

1) Issue the AttachDD DevHelp call to get the IDC entry point for the single queue device driver, which has the device name "SINGLEQ$".

2) Initialize the single queue IDC interface by performing the following steps:
   A) Set CX to the number of bytes to reserve for the single queue event queue. The number of bytes to reserve is calculated by adding 8 to the number of bytes in a mouse event and multiplying by the number of events the queue should hold.
   B) Set BX to 001h to specify the initialization function.
   C) Set AX to 0200h to indicate that the caller is the mouse.
   D) Execute an IDC call to the single queue device driver following the conventions for an IDC call.

If the initialize function passed then AX will be 0, otherwise there was an error and single queue mode should not be activated. Once a session is in single queue mode any call to read that session's event queue should fail.

During mouse event processing if single queue mode is active for the session then the mouse event is sent to the single queue device driver. The mouse event is sent to the single queue device driver by performing the following steps:

1) Set SI to the offset of the mouse event.

2) Set AH to 02h to specify that the mouse is the caller.

3) Set AL to the size of the mouse event in bytes.

4) Set BH to the offset in bytes from the beginning of the mouse event to the time stamp.

5) Set BL to 02h to specify the function is a queue write function.

6) Execute an IDC interface call to the single queue device driver using the IDC convention.

Together the mouse dependent and independent device drivers form a mouse device independent system. The essence is in the removal of the device dependent code from the old mouse device driver and the addition of the IDC interface that is independent of the mouse device attached.

Having described the invention in detail, the following are specific representative implementations in pseudo code reflective of specific drawings attached hereto.

The following is pseudo code for a mouse device dependent driver module. This is not for any specific mouse device, but is representative of a specific implementation as represented by FIG. 4A.

```
BeginSub Interrupt_Handler /*entered on mouse interrupt*/
Read interrupt data from mouse device;
InterruptDataBuffer[PacketCount] <- mouse interrupt data;
PacketCount <- PacketCount + 1;
IF <PacketCount == PACKETFULL>
    convert InterruptDataBuffer to common event format in
        InterruptPacket;
    call Mouse Device Independent Device Driver via IDC
        interface to process InterruptPacket for the system;
    PacketCount <- 0;
ENDIF
complete interrupt processing
return from interrupt to system
EndSub Interrupt_Handler
```

The following is a pseudo code representation of processing done by the mouse device independent device driver when it processes a mouse event. The pseudo code given here demonstrates the basic steps that would be performed by an implementation of this invention. The actual implementation in IBM's OS/2 operating system follows this basic structure and is representative of FIG. 4B.

Input to this routine is mouse event data in a common format. The event data is passed in a buffer called InterruptPacket.

```
BeginSub Process_Packet /*called by the mouse dependent DD via IDC*/
set up system control variables;    /*implementation dependent    */
IF <mouse support is active>        /*could involve several tests */
    IF <InterruptPacket indicates there was mouse motion>
        convert mouse motion into pointer image movement;
        calculate new pointer position;
    ENDIF
    IF <mouse event should be reported>
        build a system mouse event packet using InterruptPacket and new
            pointer position;
        IF <Hardware dependent operation required>
            call Mouse Dependent DD to do hardware operation
        ENDIF
        put mouse event in appropriate system event queue;
    ENDIF
    IF <new pointer position !=current pointer position>
        IF <new pointer position is outside display mode limits>
            adjust new pointer position to just inside display mode
                limits;
        ENDIF
        remove pointer image from current pointer position on display
            screen;
        draw pointer image at new pointer position on display screen;
        current pointer position <-new pointer position;
    ENDIF
ENDIF
return to mouse dependent device driver
EndSub Process_Packet
```

Having thus described the invention in detail, the same will be better understood from the claims which follow.

What is claimed is:

1. A device driver arrangement for use with a specific operating system of a computer system, wherein devices external to said computer system are attachable to said computer system, and said specific operating system interfaces between said computer system and application programs for controlling access to said external devices, said device driver arrangement comprising:

a device independent driver section forming an integral part of said operating system and operating independently of any electrical or physical attribute of any device externally attachable to said computer system;

a device dependent driver section discretely separate from said device independent driver section and having dependency in its operations on a characteristic of at least one device externally attachable to said computer system;

means incorporated in said device independent driver section for interacting with an application program interface (API) layer;

means incorporated in said device independent driver section for formatting data in transit between said device dependent driver section and said computer system;

means incorporated in said device independent driver section for communicating with said device dependent driver section and for managing storage of data transferred between said device dependent driver section and said computer system;

means incorporated in said device dependent driver section for communicating with said device independent driver section; and means in said device dependent driver section for managing transmittal of data between said at least one pointer device and said device independent driver section via said communicating means;

said device dependent driver dependent section having no dependence on any specific attribute of said operating system that is not contained in said device independent driver section; said device dependent driver section communicating with said operating system only through said device independent driver section.

2. A device driver arrangement in accordance with claim 1 wherein: said device dependent driver section is dependent in its operations on characteristics of at least one pointer device externally attachable to said computer system.

3. A device driver arrangement in accordance with claim 1 wherein:

said device dependent driver section is interfaced between said device independent driver section and a said device externally attachable to said system; and said device independent driver section interfaces between said device dependent driver section and parts of said operating system other than said device independent driver section.

4. A device driver arrangement in accordance with claim 1 wherein: said operating system is susceptible of containing an undocumented feature that is inaccessible to manufacturers of said external devices;

said device independent driver section is susceptible of having a dependency on said undocumented feature; and said device dependent driver section has no dependency on said undocumented feature.

5. A device driver arrangement for use with a specific operating system of a computer system, wherein devices external to said computer. System are attachable to said computer system, and said specific operating system interfaces between said computer system and application programs for controlling access to said external devices, said device driver arrangement comprising:

a device independent driver section forming an integral part of said operating system and operating independently of any electrical or physical attribute of any device externally attachable to said computer system, said device dependent driver section being dependent in its operations on characteristics of at least one pointer device externally attachable to said computer system;

a device dependent driver section discretely separate from said device independent driver section and having dependency in its operations on a characteristic of at least one device externally attachable to said computer system;

means incorporated in said device independent driver section for interacting directly with an application program interface (API) layer;

means incorporated in said device independent driver section for formatting data in transit between said device dependent driver section and said computer system;

means incorporated in said device independent driver section for communicating with said device dependent driver section;

means incorporated in said device independent driver section for managing storage of said data in transit between said device dependent driver section and said computer system;

means incorporated in said device dependent driver section for communicating with said device independent driver section; and means in said device dependent driver section for managing transmittal of data between said at least one pointer device and said device independent driver section via said communicating means incorporated in said respective sections;

said device dependent driver dependent section having no dependence on any specific attribute of said operating system that is not contained in said device independent driver section; said device dependent driver section communicating with said operating system only through said device independent driver section.

6. The device driver arrangement of claim 5 wherein said at least one pointer device is a mouse device.

7. An operating system for a computer system to which plural peripheral devices of different types are attachable, wherein each said peripheral device requires a device dependent driver program to control its operations, said operating system comprising:

a device independent driver module forming an integral part of said operating system, and providing a data communication interface between other parts of said operating system and said device dependent driver programs required by said attachable peripheral devices; said device independent driver module having no dependencies in its operations on any electrical or physical characteristic of any of said attachable peripheral devices, wherein said operating system is susceptible of containing an undocumented feature that is effectively inaccessible to manufacturers of said attachable peripheral devices, and said device independent driver module provides a data communication interface between said device dependent driver programs of said attachable peripheral devices and said operating system that attends to said undocumented feature, so that said device dependent driver programs of said attachable peripheral devices can be constructed by said manufacturers of said attachable peripheral devices without any knowledge of said undocumented feature.

8. The operating system of claim 7 wherein said attachable peripheral devices are pointer devices.

* * * * *